United States Patent [19]
Smith, Sr. et al.

[11] Patent Number: 5,214,698
[45] Date of Patent: May 25, 1993

[54] METHOD AND APPARATUS FOR VALIDATING ENTRY OF CRYPTOGRAPHIC KEYS

[75] Inventors: Ronald M. Smith, Sr., Wappingers Falls; Phil C. Yeh; Randell J. Easter, both of Poughkeepsie, all of NY.; Donald B. Johnson; An Van Le; Stephen M. Matyas, all of Manassas, Va.; Julian Thomas, Poughkeepsie, NY.; John D. Wilkins, Somerville, Va.

[73] Assignee: International Business Machines, Armonk, N.Y.

[21] Appl. No.: 672,265

[22] Filed: Mar. 20, 1991

[51] Int. Cl.$^5$ .............................................. H04L 9/08
[52] U.S. Cl. ....................................... 380/21; 380/23; 380/24; 380/29; 380/43; 380/49; 380/50
[58] Field of Search ....................... 380/20, 21, 24, 29, 380/37, 43, 44, 49, 50, 23

[56] References Cited

U.S. PATENT DOCUMENTS

4,694,491  9/1987  Horne et al. .......................... 380/20
4,803,725  2/1989  Horne et al. .......................... 380/44

Primary Examiner—Bernarr E. Gregory
Attorney, Agent, or Firm—William B. Porter; C. Lamont Whitham

[57] ABSTRACT

A cryptographic facility implements a multiple key part import procedure. The installation manager can verify that a key part has been correctly entered and has not been compromised. The security requirement for the procedure is that no single party can subvert the system security by misusing the procedure. This is accomplished by the use of a control-vector-dependent verification pattern to indicate that each key part has been accepted by using the proper control vector and the use of different key switch positions to specify whether the key part is a master key part or an operational key part and whether the key part is a first part or a subsequent key part. The apparatus provides an automatic reset of the key part register at the completion of each key-entry instruction so that each key part can be imported only once. This prevents the same key part from being imported twice as different key part types. The apparatus also prevents a key part from being combined with itself to create a known key. The procedure is fail-safe so that the program cannot steal a key part from a previously failed procedure.

23 Claims, 6 Drawing Sheets

METHOD AND APPARATUS FOR VALIDATING ENTRY OF CRYPTOGRAPHIC KEYS

DESCRIPTION Background of the Invention

1. Field of the Invention

The present invention generally relates to an improved cryptographic key distribution method and apparatus.

2. Description of the Prior Art

Cryptography is an effective method of protecting information while it is being transmitted through a communication link or while it is stored in a medium vulnerable to unauthorized access. Cryptographic operations can also be used for processing message authentication codes (MACs) and personal identification numbers (PINs) in a financial transaction environment. As the connectivity of computer networks and the quantity and value of information processed by computers increases, growing concerns have been raised about the threat of disclosure or modification, whether accidentally or intentionally, of sensitive data. Computer users have demanded high-speed cryptographic functions for bulk encryption to provide network and database security. Also, because of the pervasive use of PINs at automated teller machines (ATMs) and point-of-sale (POS) terminals and the increasing use of electronic funds transfer among banks and wholesale institutions, the financial industry has become more security conscious and has started to demand high-performance and high-security computer systems to support many types of financial transactions.

Whenever cryptographic keys occur outside a cryptographic facility, they are maintained under the encipherment of some key-encrypting key (KEK). This allows cryptographic keys to be routed through the system over paths that are nonsecure. A cryptographic key can be recovered in a usable form only if the recipient possesses the key-encrypting key under which the cryptographic key has been encrypted. However, one cannot always rely on encryption as a means of protecting the secrecy of initial KEKs, since each node must have at least one key installed initially in clear form. That key must be sent to the node over a path with an acceptable degree of security. One such method is to use a courier, normally the safest and most secure means of transporting keys. Of course, security in this case depends on the reliability of the courier.

The cryptographic facility must provide for manual entry of the master key and certain operational keys. An operational key here means any cryptographic key other than the master key. Since the security of the system is dependant on the secrecy of these keys, it is important that the installation manager be able to verify that the key has been correctly entered and has not been compromised.

The key entry process normally involves interaction with a program. The design of a secure key entry process must take into consideration that someone may attempt to compromise the system by making subtle changes to the program which interacts with the manual key entry. Depending on the exact nature of the manual key entry program interface, it could be possible for the program to input the key in a form which would make it usable in undesirable ways, or even to get a copy of the key in the clear.

Assume, for example, that the courier intends that the key is to be entered as an importer key, which is a KEK and is used to encrypt other keys sent to this system, but instead, the program accepts the key as a data-encrypting key. Then the program can use this key to get subsequent keys sent to this system in the clear. Or, if the program could indicate to the courier that the key is being accepted as a master key, when in reality the program is accepting it as an operational key, then the program would have the master key in a form which could be exported.

In the patented literature, the following U.S. patents are considered relevant prior art: U.S. Pat. No. 4,912,762 to Lee et al. for "Management of Cryptographic Keys", U.S. Pat. No. 4,918,728 to Matyas et al. for "Data Cryptography Operations Using Control Vectors", U.S. Pat. No. 4,924,514 to Matyas et al. for "Personal Identification Number Processing Using Control Vectors", U.S. Pat. No. 4,924,515 to Matyas et al. for Secure Management of Keys Using Extended Control Vectors", and U.S. Pat. No. 4,941,176 to Matyas et al. for "Secure Management of Keys Using Control Vectors". The patent to Lee et al. relates to a verification pattern used for a master key but does not use control vectors, while the patents to Matyas et al. outline the use of control vectors for key separation but not as an aid in ensuring security of the key entry process. Additional discussion on the problem of ensuring security of the key entry process may be had by reference to C. Meyer and S. Matyas, Cryptography: A New Dimension in Computer Data Security, Wiley (1982).

SUMMARY OF THE INVENTION

It is therefore an object of the present invention to provide a secure method and apparatus for validating the manual entry of cryptographic keys.

According to the invention, a dual control method ensures that no single person knows the key being manually entered. With dual control, two couriers provide the key parts, the two parts are Exclusive ORed inside the secure boundary, and no one person knows the key. Thus, the security requirement for the manual key entry procedure provided by the invention is that no single party (i.e., any courier or the key entry program) can subvert the system security by misusing the procedure.

More specifically, the invention includes within a cryptographic facility a key-part register into which the key part is first loaded. The key- part register can be empty or full and also has an enabled and disabled state. Several important controls are associated with the key-part register. These include special instructions provided for the program to enable and disable the key part register. The enabled or disabled state of the key-part register is displayed as a physical indicator. This gives the operator an indication of what the program is doing, whether the program is yet ready for the key part to be input and when the key part has been accepted by the program. The key-part register is automatically reset at the completion of each key-entry instruction. This prevents the program from importing the key part twice, as different types. The key-part register is also reset when the key-entry procedure is completed or terminated by changing the key-switch setting. This permits the operator to clear the key-part register if, for some reason, the program does not accept the key part.

A manual key switch is provided with positions to indicate whether the key part being entered is an operational key part or a master key part and whether it is the first part or a subsequent part. Separate instructions operate on the different types (the master key or operational key) and different parts. Only the proper instruction set can be used for a particular type and part. Operational key parts and master key parts are kept separated. The key parts for a master key are kept in a special register and cannot be extracted from the secure boundary, while operational key parts are enciphered using a special control vector and are returned to the program. The instructions which import or combine operational key parts provide a verification pattern which is dependent on the key type. This verification pattern can be used to verify that the program received the operational key for the intended type. The instructions which combine operational key parts allow only one key part to be specified by the program and require the other key part be in the key-part register. This prevents the program from creating a known key.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The integrated cryptographic facility (ICRF) on which the invention is implemented specifies the intended usage of a cryptographic key by assigning a key type to the key. Thus, a key type is used to achieve key separation. When a key is generated or imported, the type of the key is declared and remains unchanged thereafter. The ICRF uses control vectors to specify key types and control the intended usage of cryptographic keys. A control vector is assigned to each key type. A key encrypting key (KEK) derivative is computed by Exclusive ORing of the KEK with an appropriate control vector. If an encrypted key is misused in an unintended cryptographic function, the derivative of the specified KEK assumed by the operation is different from the one actually used to protect the key, and the key cannot be correctly retrieved by the operation. When a key is exported or imported by using the key management functions, the same control vector is used to obtain the KEK derivative that protects the key externally as is used to obtain the master key derivative that protects the key in the system.

A data encryption algorithm (DEA) (as promulgated in the Data Encryption Standard (DES) Federal Information Processing Standards (FIPS) publication 46) based cryptographic system requires an effective mechanism for the secure generation, distribution and installation of cryptographic keys. The control vector scheme provides a high-security means for the key creator to control the usage of the keys by the key receiver. The subject invention is specifically directed to the problem of key distribution and key installation. Key distribution is performed by splitting a key into two or more parts, each part having the same length as the complete key. The complete key is obtained by Exclusive ORing all the key parts. A dual key entry procedure is provided for the manual installation of the keys.

Figure 1:
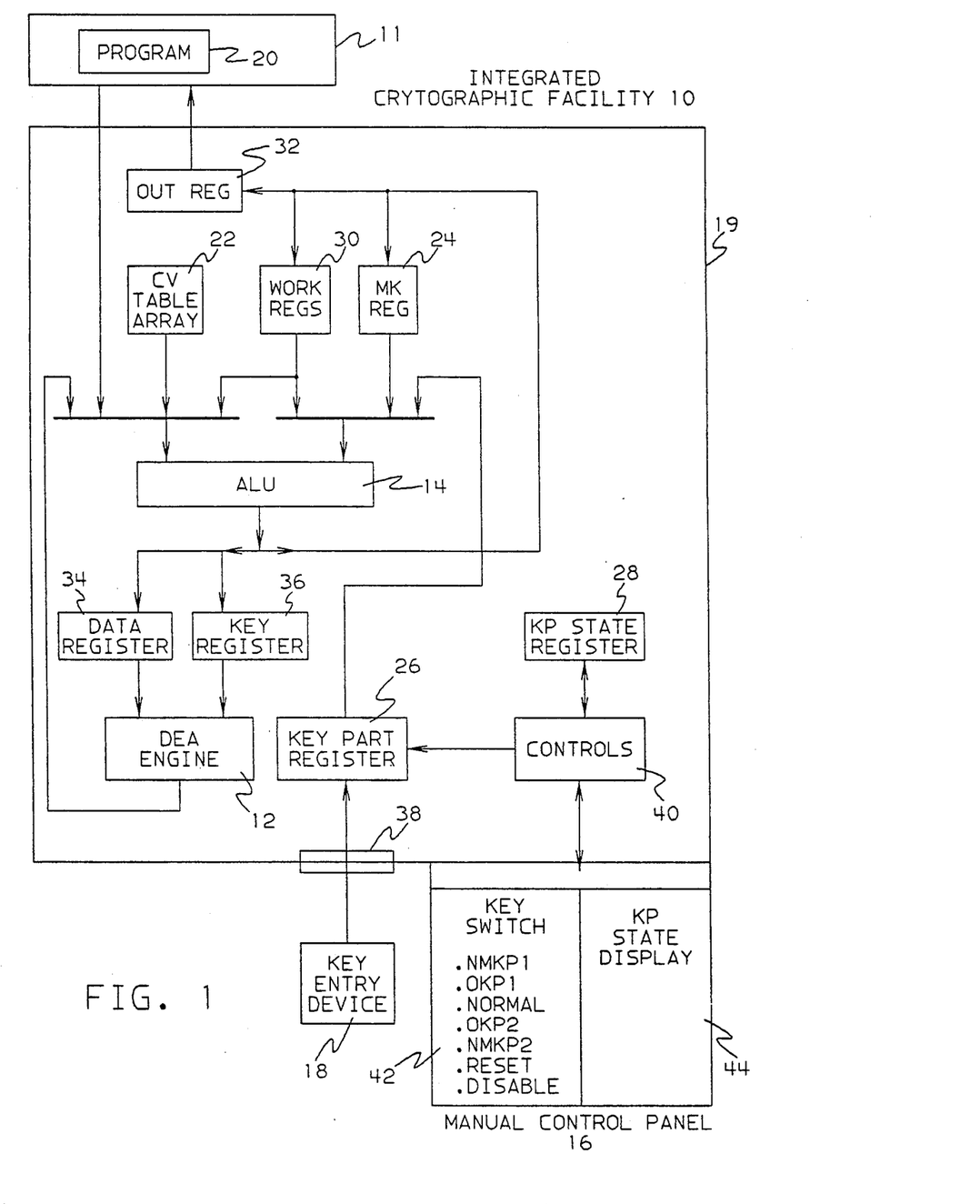
FIG. 1 is a block diagram of the integrated cryptographic facility on which the preferred embodiment of the invention is implemented.

Referring now to the drawings, and more particularly to FIG. 1, there is shown a block diagram of the integrated cryptographic facility (ICRF) 10 in which the subject invention is implemented. The ICRF 10 consists of a number of cryptographic functions which run under the control of a program 20 running on a central processing unit (CPU) (11). To achieve high-performance and high-security objectives, all cryptographic functions are defined to be privileged, CPU-synchronous functions. The facility includes a DEA engine 12, an arithmetic and logic unit (ALU) 14, a manual control panel 16, a control-vector (CV) table 22, and a number of registers. These registers include a master key (MK) register 24, a key-part register 26, a key-part-state register 28, various work registers 30, and an output register 32. The ALU 14 receives inputs from the CV table Array 22, the MK register 24, the key-part register 26, and the work registers 30. The ALU also receives inputs from the CPU 11 under control of program 20 and provides outputs to the program CPU 11 via the output register 32. The DEA engine 12 also provides an input to the ALU 14 in response to data and a key loaded in the data and key registers 34 and 36 by the ALU 14.

Figure 2:
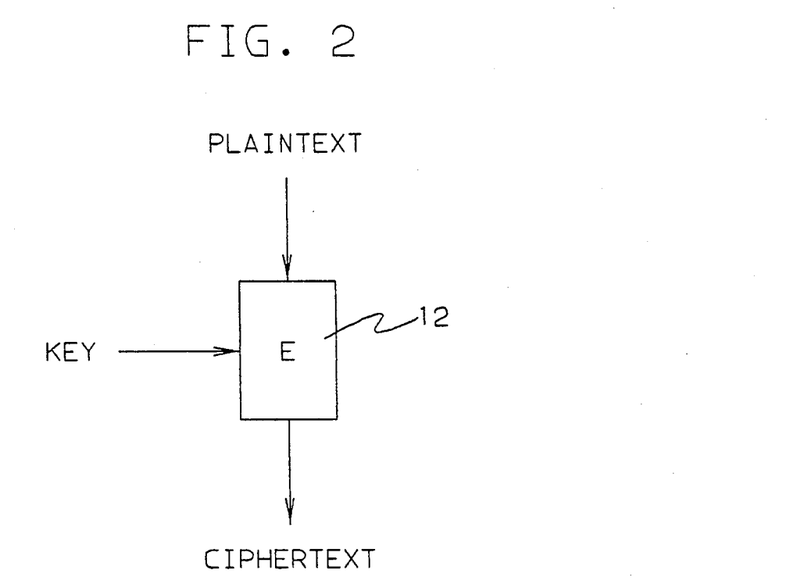
FIG. 2 is the graphic notation of the data encryption algorithm (DEA)
Figure 3:
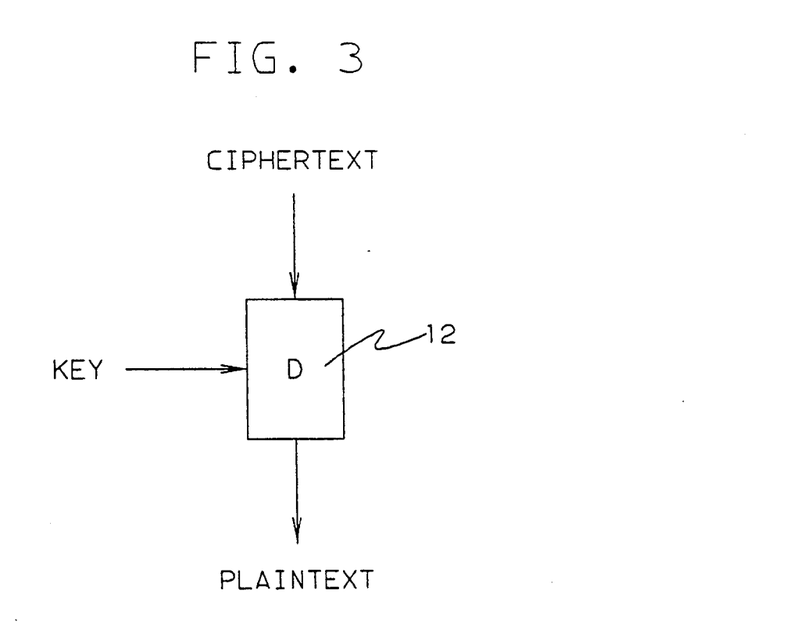
FIG. 3 is the graphic notation of the DEA decryption algorithm.

The DEA engine 12 performs the functions graphically illustrated in FIG. 2 and 3. More specifically, in FIG. 2, the DEA engine 12 operates as an encrypting engine in which plaintext is input and encrypted under a key to produce ciphertext. In FIG. 3, the DEA engine 12 operates as an decrypting engine in which ciphertext is input and decrypted under a key to produce plaintext. The operations of the DEA engine 12 and ALU 14 pertaining to the encryption and decryption processes are controlled by the program 20. As to the particular processes involved, the reader is referred to FIPS publication 46 referenced above.

Referring back to FIG. 1, the facility is physically protected by a tamper-resistant secure enclosure 19. Secret information, such as clear keys or clear PINs (personal identification numbers), or secret intermediate results, are always kept inside the physically secure boundary of the ICRF enclosure 19. The ICRF 10 also includes an interface 38 in the secure enclosure 19 to which an external key-entry device 18, such as a keypad, can be attached.

Information about the master key and some internal secret data is preserved in nonvolatile storage (not shown) while the main power of the machine is off. The MK register 24 contains the current master key used by normal cryptographic functions. The key-part register 26 is used as a buffer for manually importing cryptographic keys from the external key entry device 18. The key-part-state register 28 is provided to maintain information on the key-part register 26 state.

The manual control panel 16 interfaces with the key-part-state register 28 via controls 40 and includes a key switch 42 and a key-part-register state display 44. The key switch is provided for clearing secret quantities, disabling the ICRF, and controlling the use of certain special cryptographic functions. The key switch includes the following manual controls or positions:

Reset—While this control is on, a second reset control (not shown) is enabled which causes all secret quantities in the ICRF to be set to zeros. This control consists of two physical switches to reduce the chance of accidental performance of the reset function.

Disable—While this control is on, all cryptographic functions are disabled.

Operational Key Part 1 (OKP1)—While this control is on, the import-key-part function (shown in FIG. 5) is enabled for importing the first key part of an operational key.

Operational Key Part 2 (OKP2)—While this control is on, the combine-intermediate-key- part and combine-final-key-part functions (shown in FIGS. 6 and 7, respectively) are enabled for importing the second or subsequent key part of an operational key.

New Master Key Part 1 (NMKP1)—While this control is on, a function is enabled for importing the first key part of a new master key.

New Master Key Part 2 (NMKP2)—While this control is on, a function is enabled for importing the second or subsequent key part of a new master key.

Normal—While this control is on, only normal cryptographic functions are enabled.

Only one control of normal, OKP1, OKP2, NMKP1, and NMKP2 can be turned on at any time, and changing the setting of the key switch 42 between these clears the contents of the key-part register 26 via controls 40. The setting of all the above requires physical keys. Different physical keys are required for entering the first key part than for entering the remaining key parts of an operational key or a master key.

The display 44 on the manual control panel 16 provides the visual feedback to the courier required in the installation of key parts. The key-part-state display 44 provides a display of the key-part-state register 28 status. The key-part-state display 44 must show a status of enabled-and-empty for the key-part register 26 before the courier can commence inputting a key part.

Figure 4:
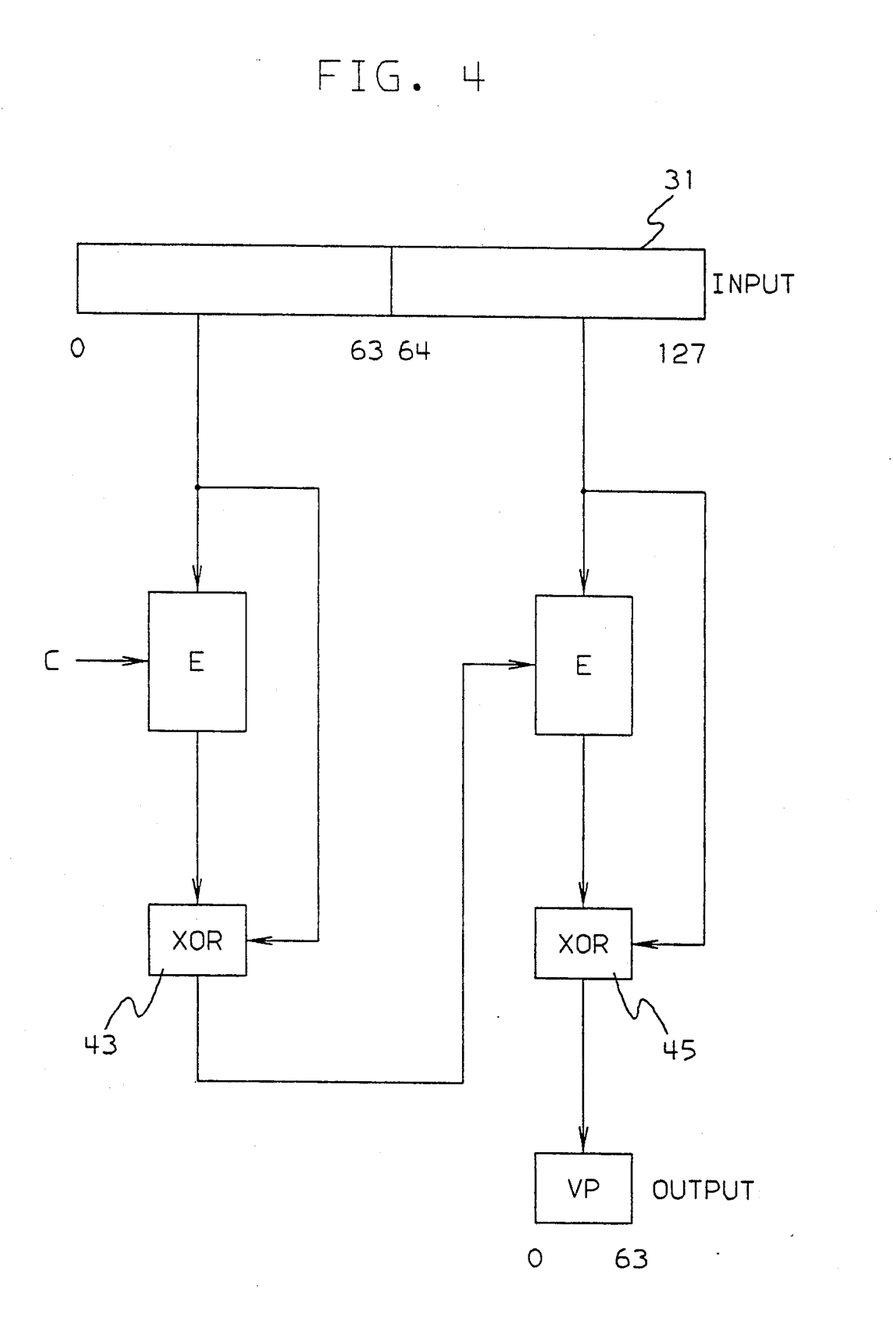
FIG. 4 is a block diagram of the verification-pattern generation algorithm which is used by the preferred embodiment of the invention.

A verification pattern is derived by means of a cryptographic one-way function generally illustrated in FIG. 4, to which reference is now made. A 128-bit register 31 is divided into two parts, each consisting of 64 bits. The first 64-bit part is encrypted in the DEA engine 12 under a constant DEA key C. The ciphertext output of the DEA engine 12 is Exclusive ORed with the plaintext input in XOR block 43, and the output of XOR block 43 is used as a key to encrypt the second 64-bit part in DEA engine 12. The ciphertext output is again Exclusive ORed with the plaintext input in XOR block 45 to produce the 64-bit verification pattern output. It will be understood that the Exclusive OR functions represented by XOR blocks 43 and 45 are performed sequentially by ALU 14 and that the encryptions performed by DEA engine 12 are also performed sequentially.

ICRF 10 provides a secure means for manually installing the master key and operational keys using a dual-key-entry process. The dual-key-entry process requires that the clear key be split into two or more parts, each part having the same length as the complete key. Each key part is separately entered by means of the manual key-entry device 18, and the key parts are combined to form the complete key by Exclusive ORing the corresponding bits of the key parts in the ALU 14.

For master key entry, the key parts are combined in the cryptographic facility. After having been entered, the key parts of a master key never leave the physically secure boundary 19. A verification pattern is provided for each newly entered key part. The pattern is computed using a cryptographic one-way function and can be used to verify whether the key part has been correctly entered.

Unlike master key parts, it is impractical to maintain the partially completed parts of operational keys within the physically secure boundary 19. It may be required, for example, for one courier to enter the first parts of several different keys and then for a different courier to enter the second parts of those keys.

Figure 5:
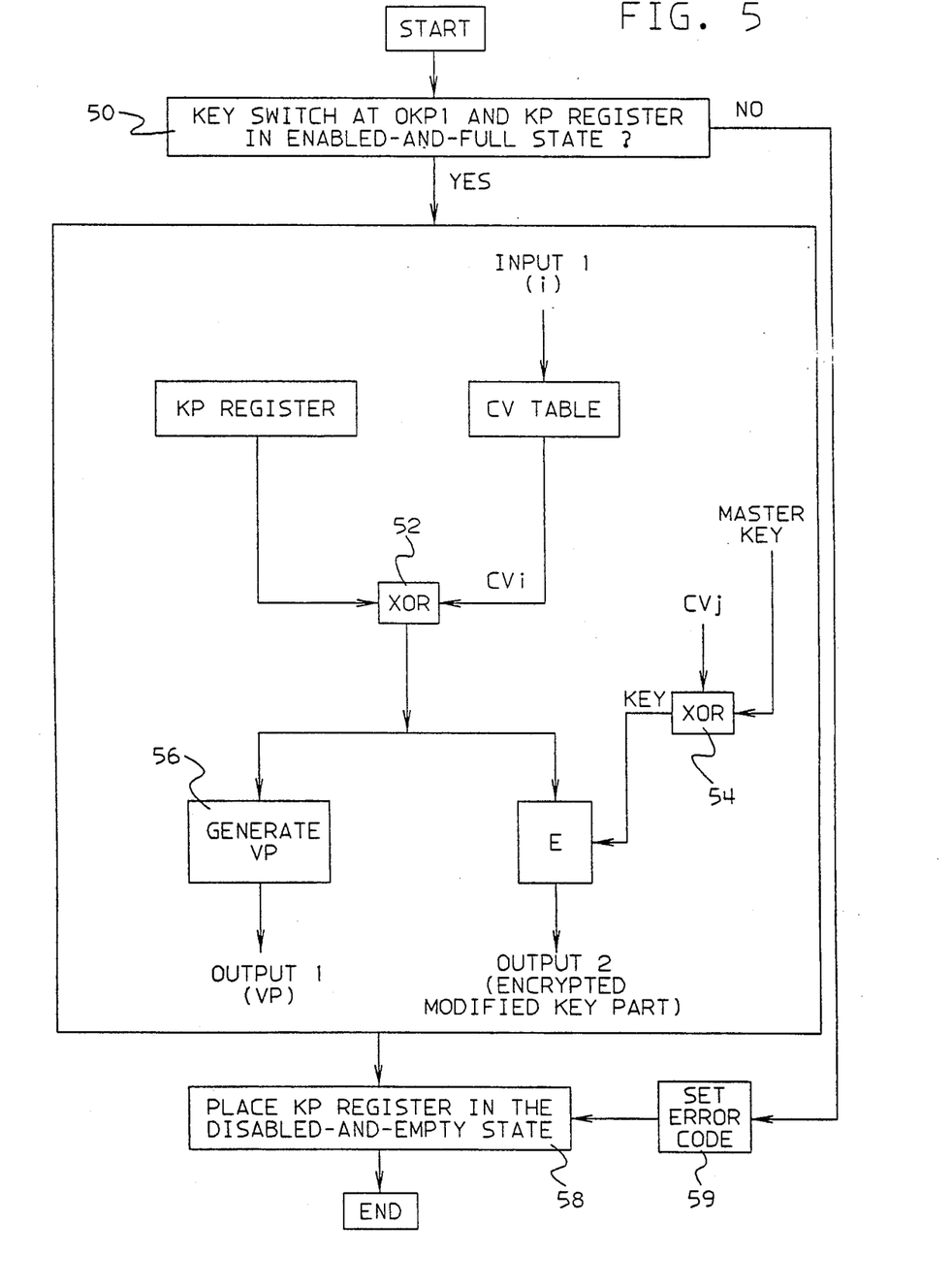
FIG. 5 is a block diagram of the import-key-part instruction which is used by the preferred embodiment of the invention to import the first key part of an operational key.
Figure 6:
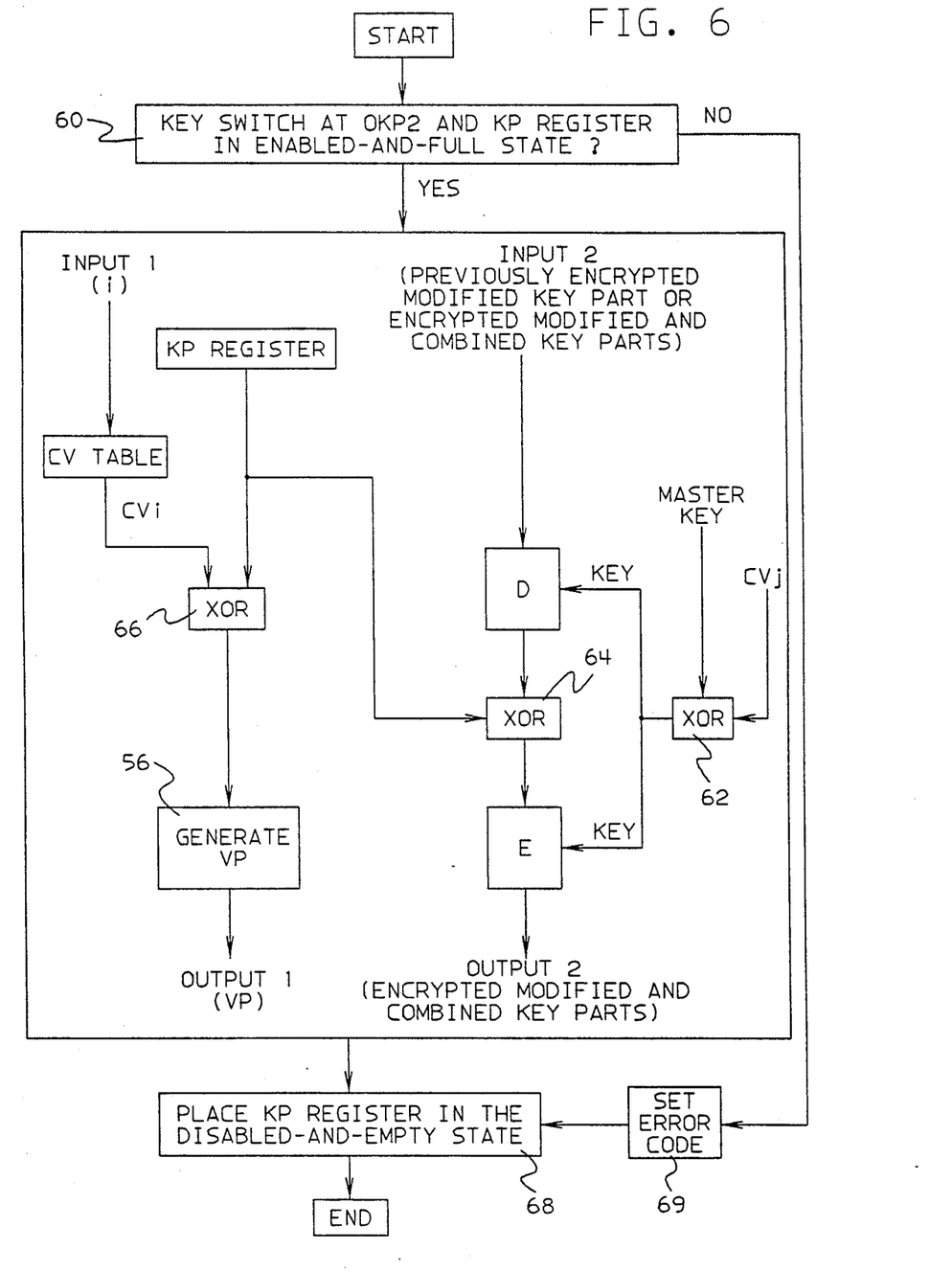
FIG. 6 is a block diagram of the combine-intermediate-key-part instruction which is used by the preferred embodiment to import an intermediate key part of an operational key.
Figure 7:
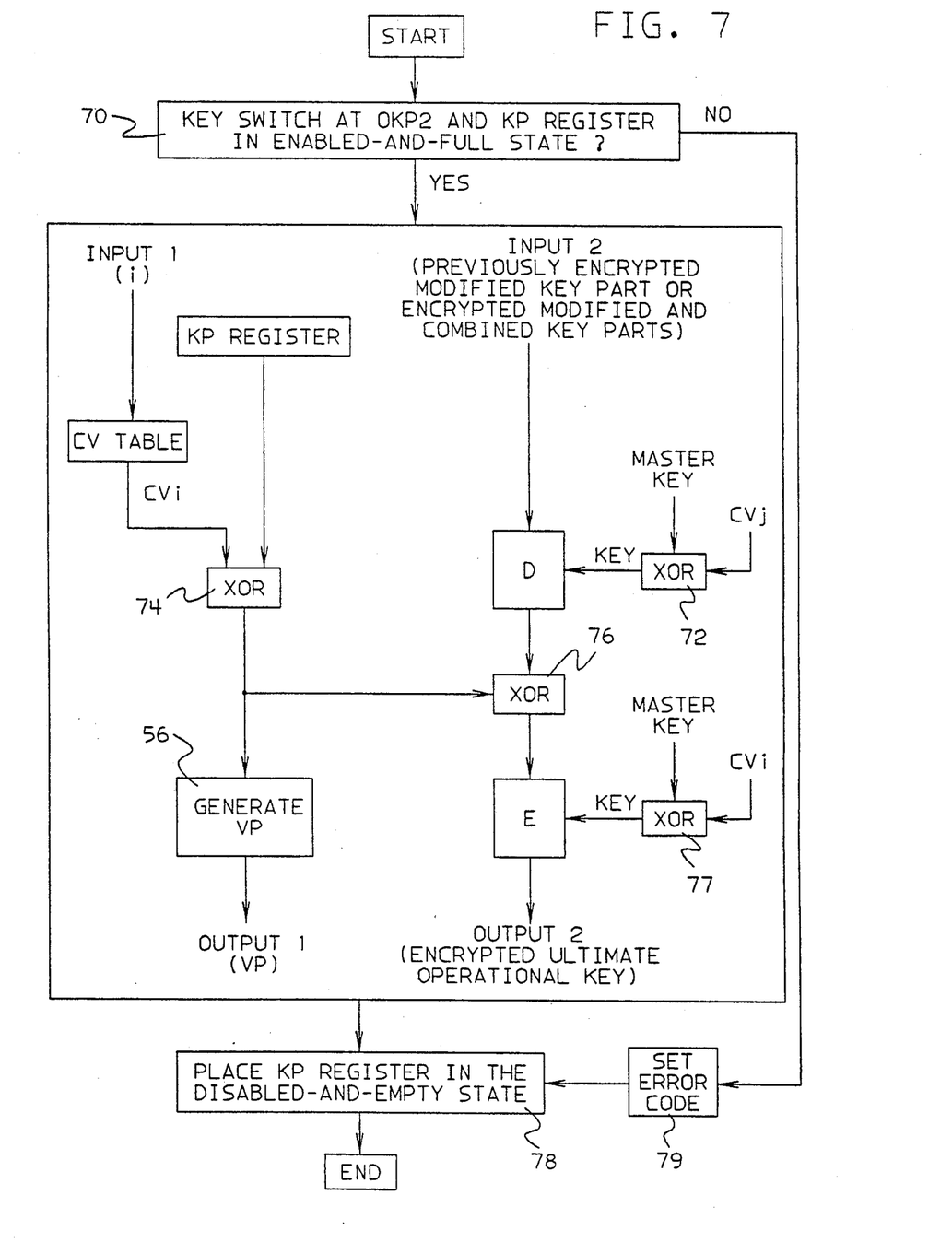
FIG. 7 is a block diagram of the combine-final-key-part instruction which is used by the preferred embodiment to import the final key part of an operational key.

Referring now to FIGS. 5, 6 and 7, there are shown block diagrams of the key-entry instructions for importing key parts of an operational key. The instructions consist of the import-key-part, combine-intermediate-key-part, and combine-final-key-part instructions. The import-key-part instruction (FIG. 5) is used to import the first key part of an operational key. The combine-intermediate-key-part instruction (FIG. 6) is used to import an intermediate key part of an operational key. The combine-final-key-part instruction (FIG. 7) is used to import the final key part.

At the beginning of the instruction execution in FIG. 5, a test is made in decision block 50 to determine if the key switch 42 is at OKP1 and whether the key-part register 26 is in enabled-and-full state. The state of the key-part register 26 is displayed to the courier via key-part-state display 44. The enabled-and-full state occurs when the courier has entered the key part. Assuming that the key switch 42 is at OKP1 and the key-part register 26 is in the enabled-and-full state, the instruction execution within the ICRF 10 proceeds. The input i from the CPU 11 under control of program 20 specifies the intended key type or use of the ultimate key. This is used as an index for the CV table 22 which provides as its output a control vector $CV_i$. The key part that has been entered into key-part register 26 is Exclusive ORed with control vector $CV_i$ in XOR block 52, and the resulting output, the modified key part, is provided as plaintext input to the DEA engine 12. The key for the DEA engine 12 is generated by Exclusive ORing a control vector $CV_j$ with the master key in XOR block 54. The value of control vector $CV_j$ is used only for protecting key parts. It will be understood that the Exclusive OR functions are performed in the ALU 14.

The output of XOR block 52 is also input to the generate verification pattern (VP) block 56. The verification pattern is derived by means of the cryptographic one-way function shown in FIG. 4. Output 1 from the generate VP block 56 is returned to the CPU 11 under control of program 20 for auditing purposes. Output 2 from the DEA engine 12 is also returned to the CPU 11 for future combine operations.

After the key entry process has been completed, the key-part register 26 is placed in the disabled-and-empty state, as indicated in function block 58. This insures that one key part of an operational key cannot be imported more than once. The key-part register 26 is also placed in the disabled-and-empty state when an error indication is set in function block 59 as a result of the key switch 42 not being at OKP1 or the key-part register 26 not being in the enabled-and-full state, as determined by the decision block 50.

In FIG. 6, the second or subsequent part of an operational key is entered. A test is first made in decision block 60 to determine if the key switch 42 is at OKP2 and the key-part register 26 is in the enabled-and-full state. If so, input 2 (the previously encrypted modified key part, that is output 2 of FIG. 5, or encrypted modified and combined key parts, that is output 2 of FIG. 6) is input to the DEA engine 12 which decrypts that part under a key derived from Exclusive ORing the master key with the control vector $CV_j$ in XOR block 62. The plaintext output from the DEA engine 12 is then Exclusive ORed with the contents of key-part register 26 in XOR block 64. The resulting output is then encrypted in the DEA engine 12 under the key derived from XOR block 62.

Meanwhile, the contents of the key-part register 26 is Exclusive ORed in XOR block 66 with the control vector $CV_i$ from CV table 22. The output of XOR block 66 is supplied to the generate VP block 56, which provides output 1 to the CPU 11 under control of program 20 as before. Output 2 from the DEA engine 12 is the encrypted modified and combined key parts and is also returned to the CPU 11 for subsequent combine operations.

When the process is complete, the key-part register 26 is placed in the disabled-and-empty state in function block 68, again ensuring that the key part is only imported once. The key-part register 26 is also placed in the disabled-and-empty state when an error indication is set in function block 69 as a result of the key switch 42 not being at OKP2 or the key-part register 26 not being in the enabled-and-full state, as determined by the decision block 60.

The process shown in FIG. 7 is similar to that shown in FIG. 6 and begins with a test in decision block 70 to determine if the key switch 42 is at OKP2 and the key-part register 26 is in the enabled-and-full state. If so, input 2 (the previously encrypted modified key part or encrypted modified and combined key parts) is decrypted in DEA engine 12 under a key derived from Exclusive ORing the master key with the control vector $CV_j$ in XOR block 72. The value of control vector $CV_j$ is the special value used only for protecting key parts. The contents of the key-part register 26 are Exclusive ORed with the control vector $CV_i$, which is designated by the input i specified by the program 20, from CV table 22 in XOR block 74. The output of XOR block 74 is Exclusive ORed with the plaintext output from DEA engine 12 in XOR block 76. The output from XOR block 76 is then encrypted in DEA engine 12 under a key derived by Exclusive ORing the master key with control vector $CV_i$ in XOR block 77. The ciphertext output (output 2) of the DEA engine 12 is the encrypted ultimate operational key and is returned to the CPU 11 under control of program 20.

The output of XOR block 74 is also input to the generate VP block 56 to provide a verification pattern output (output 1) to the CPU 11. As before, after the key entry process has been completed, the key-part register 26 is placed in the disabled-and-empty state, as indicated in function block 78. The key-part register 26 is also placed in the disabled-and-empty state when an error indication is set in function block 79 as a result of the key switch 42 not being at OKP2 or the key-part register 26 not being in the enabled-and-full state, as determined by the decision block 70.

As can be seen, before a partially completed key part is returned to the CPU 11 under control of program 20, it is Exclusive ORed with the control vector ($CV_i$) for the intended key type and is then encrypted using a special master-key derivative (based on the control vector $CV_j$). This value is returned to the program for subsequent combine operations.

Each of these instructions requires that the intended key type of the ultimate key be specified (input parameter i) by the program. Thus, to obtain a meaningful result, the program must specify the same intended key type when the partial key part is output from one step and then again when it is input to the next step. If the key part to be combined is the final key part, the result (output 2 in FIG. 7) is encrypted under the master key derivative obtained by using the control vector ($CV_i$) for the key type of the ultimate key. The encrypted quantity is the ultimate key and is returned to the program.

The following briefly describes the manual-key-entry process for installing an operational key part:

First, when an operational key part is to be installed, the courier must invoke the appropriate program 20 and request the service for manual key entry. The courier must also inform the program the key type of the ultimate operational key.

The key-part register 26 is normally in the disabled-and-empty state, which prohibits any key part from being installed. The register 26 can accept a key part entered from the external key entry device only when the register is in the enabled-and-empty state. Therefore, the program executes an enabled-key-part-register instruction to place the key-part register 26 in the enabled-and-empty state. This change of the register state is displayed at the key-part-state display 44 of the manual control panel 16 to inform the courier that the program is ready for importing a key part.

Next, the courier sets the key switch 42 to the appropriate position. For installing a first key part, the switch is set to OKP1, and for installing a second or subsequent key part, the switch is set to OKP2. The key part is entered into the key-part register 26 through the key-entry device 18. This causes the key-part register 26 to be placed in the enabled-and-full state.

A sense-cryptographic-status instruction is provided for the program to detect the state change of the key-part register. After detecting that the key-part register 26 is in the enabled-and-full state, the CPU 11 under control of program 20 then executes the appropriate instruction to import the newly entered key part. For importing a first key part, the import-key-part instruction is executed (FIG. 5). For importing an intermediate or final key part, the combine-intermediate-key-part or combine-final-key-part instruction is executed (FIGS. 6 or 7). The verification pattern (VP) for the newly entered key part is used to verify that the key part has been correctly imported. Finally, the courier sets the key switch 42 back to the normal position to complete the manual key-entry process.

Security of the manual key entry process is critical to the security of the entire system. Since the manual key entry process involves interaction with a program, the secure key entry process according to the invention takes into consideration that someone may attempt to compromise the system by making subtle changes to the program.

The following summarizes major characteristics and explains security aspects of the invention. The dual-key entry process according to the invention requires two physical keys to enter a complete key; one physical key to enter the first key part and another physical key to enter subsequent key parts. This ensures that one person does not enter both parts. In addition, different manual controls are required for importing a master key part than for importing an operational key part. This prevents the program from importing a master key as an operational key or vice versa.

Changing the setting of the manual key-switch controls clears the contents of the key-part register 26. This prevents the program from stealing a key part previously entered. This could happen, for example, if the previous dual-key entry process failed in the middle because of a transient hardware failure. The key-part register 26 is placed in the disabled-and-empty state by the execution of each key-entry instruction so that key-entry instructions cannot be retried by the program. This prevents the program from importing an operational key part twice, as different types. For example, if those functions are allowed to be retried, key parts for a message authentication code (MAC) verification key could be additionally imported by the program as a MAC generation key. The program then has the potential to forge messages with valid MACs. As another example, if the program is permitted to combine a particular key part multiple times, then the program can cancel out the result by combining it twice. Thus, the security of the key with multiple key parts could be reduced.

The combine key part functions allow only one key part to be specified by the program and requires the other key part be in the key-part register 26. If all key parts could be independently imported by means of the import-key-part function and combine-key-parts function were allowed to accept both key parts specified by the program 20, then the program could specify a key part of any type for both arguments and obtain a known key of the key type. The clear value of the resulting key is zero because the result of the Exclusive ORing a value with itself is zero.

The verification pattern (VP) produced by key-entry functions for importing operational key parts is computed based on the value resulting from Exclusive ORing the newly entered key part with the control vector specifying the key type of the ultimate key. Thus, the pattern can be used not only to verify whether the key part has been correctly entered, but also whether the correct intended key type was specified. If this capability of detecting a key type of the imported key part were not provided, the program could subvert system security without being caught.

With all of the above, the program might still subvert system security by tricking couriers to enter each key part of an operational key twice. For example, after the program imported a key part with the intended type, the program could display a message to the courier requesting the same key part to be reentered because the previous one was lost due to a hardware transient error. If the courier does as requested, the program could then import the key part with a different type. To be absolutely sure about the security, couriers should never enter any key part twice on the same system. With this proviso, a secure manual key entry procedure is provided such that no single part, the key entry program or any courier, can compromise system security.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for securely importing into a data processing system a cryptographic key by a multiple key part import procedure comprising the steps of:
   receiving by said data processing system information specifying an intended us of an ultimate key;
   receiving by said data processing system a first key part;
   combining said first key part with said information specifying the intended use of an ultimate key and then storing the result as a modified key part;
   verifying the intended use of said first key part;
   receiving by said data processing system a second key part;
   combining said second key part and said modified key part to produce said ultimate cryptographic key; and
   verifying the intended use of said second key part.

2. The method recited in claim 1 wherein said information combined with said first key part consists of a control vector which is a function of an intended use of the ultimate key.

3. The method recited in claim 1 wherein the steps of verifying are performed using a one-way cryptographic function.

4. The method recited in claim 3 wherein the result of the one-way cryptographic function is a usage-dependent verification pattern.

5. The method recited in claim 1 further comprising the step of limiting the importation of each key part to once only.

6. The method recited in claim 5 further comprising the step of clearing a key part after it is imported.

7. The method recited in claim 5 further comprising the step of generating usage-independent verification pattern of the key part.

8. The method recited in claim 1 further comprising the steps of:
   encrypting modified key part prior to storing;
   decrypting the stored encrypted modified key part prior to combining with said second key part; and
   encrypting said ultimate key.

9. In a data processing system, an apparatus for securely importing by a multiple key part import procedure a cryptographic key comprising:
   input means for receiving information specifying an intended use of an ultimate key;
   key usage storage means for storing information specifying the intended use of the ultimate key from said input means;
   cryptographic key entry means for receiving key parts;
   key part storage means for sequentially storing at least first and second key parts entered from said cryptographic key entry means;
   first combination means responsive to a first key part stored in said key part storage means and the information stored in said key usage storage means for combining said first key part with said information to form a modified key part;

temporary storage means for temporarily storing said modified key part;

first generation means for generating a first verification pattern responsive to said first combination means;

second combination means responsive to a second key part stored in said key part storage means and said modified key part stored in said temporary storage means for combining said second key part and said modified key part to produce said ultimate key; and second generation means for generating a second verification pattern responsive to said second key part stored in said key part storage means and said information stored in said key usage storage means.

10. The apparatus of claim 9 further comprising display means for displaying a status of said key part storage means.

11. The apparatus of claim 9 in which said first and second generation means each perform a one-way cryptographic function.

12. The apparatus of claim 9 wherein said cryptographic key entry means includes cryptographic key entry controls for enabling an entry of each key part and for clearing contents of said key part storage means.

13. The apparatus of claim 9 wherein said cryptographic key entry means includes automatic auditing means for reporting information concerning a status of the key part storage means and a value and intended use of the key part.

14. The apparatus of claim 9 wherein said key part import means and said final key part combination means cause contents of the key part storage means to be cleared at a completion of an operation.

15. The apparatus of claim 9 wherein said key part import means and said second combination means include automatic auditing means for reporting information concerning a value and intended use of a key part.

16. The apparatus of claim 9 further comprising:

means for encrypting contents of said modified key part storage means and returning encrypted information to a program; and means for receiving information from the program and decrypting this information before placing it in the modified key part storage means.

17. The apparatus of claim 9 wherein said key usage storage means includes a table indexed by said information specifying the intended use of the ultimate key for generating a control vector to be used by said first and second combination means.

18. The apparatus of claim 9 wherein said first and second combination means are a single combination means performing functions in sequence.

19. The apparatus of claim 18 wherein said single combination means performs an Exclusive OR function.

20. The apparatus of claim 9 wherein said key part storage means sequentially stores at least three key parts entered from said cryptographic key entry means, said apparatus further comprising intermediate combination means responsive to an intermediate key part stored in said key part storage means between entries of said first and second key parts and to said modified key part stored in said temporary storage means for combining said intermediate key part and said modified key part to produce modified combined key parts, said modified combined key parts being stored in said temporary storage means.

21. The apparatus of claim 20 wherein said intermediate key part combination means causes content of the key part storage means to be cleared at a completion of an operation.

22. The apparatus of claim 20 wherein said intermediate key part combination means includes automatic auditing means for reporting information concerning a value and intended use of a key part.

23. The apparatus of claim 20 wherein said first, intermediate and second combination means are a single combination means performing functions in sequence.

* * * * *